US007427321B2

(12) United States Patent
Hilton et al.

(10) Patent No.: US 7,427,321 B2
(45) Date of Patent: Sep. 23, 2008

(54) FOAMED FIREPROOFING COMPOSITION AND METHOD

(75) Inventors: Dennis M. Hilton, Nashua, NH (US); Michael D. Morgan, Billerica, MA (US); Robert Paul, Maynard, MA (US); Karl D. Taub, Boxboro, MA (US); Robert S. Young, Greenville, SC (US); Ricky N. Bastarache, Fitchburg, MA (US)

(73) Assignee: W.R. Grace & Co. -Conn., New York, NY (US)

( * ) Notice: Subject to any disclaimer, the term of this patent is extended or adjusted under 35 U.S.C. 154(b) by 634 days.

(21) Appl. No.: 10/674,745

(22) Filed: Sep. 30, 2003

(65) Prior Publication Data

US 2004/0061098 A1 Apr. 1, 2004

Related U.S. Application Data

(60) Division of application No. 10/305,991, filed on Nov. 27, 2002, now Pat. No. 6,699,915, which is a continuation-in-part of application No. 10/044,547, filed on Jan. 11, 2002, now Pat. No. 6,780,230, which is a continuation-in-part of application No. PCT/IB01/01604, filed on Sep. 3, 2001.

(51) Int. Cl.
*C08J 9/30* (2006.01)

(52) U.S. Cl. .................. 106/122; 106/692; 106/695; 106/696; 106/740; 106/772; 106/775; 106/792; 106/793; 106/794; 521/65; 521/78; 521/83; 521/141; 521/144; 524/425

(58) Field of Classification Search .................. 521/83, 521/141, 65, 78, 144; 106/122, 692, 695, 106/713, 740, 770, 772, 775, 792, 793, 794; 524/425
See application file for complete search history.

(56) References Cited

U.S. PATENT DOCUMENTS

| | | | |
|---|---|---|---|
| 2,017,022 A | 10/1935 | Roos | 106/24 |
| 2,080,009 A | 5/1937 | Roos | 152/2 |
| 2,862,829 A | 12/1958 | Dixon | 106/88 |
| 2,985,219 A | 5/1961 | Summerfield | 154/1 |
| 3,719,513 A | 3/1973 | Bragg et al. | 106/114 |
| 3,839,269 A | 10/1974 | Comegys | 260/41 R |
| 3,963,507 A | 6/1976 | Kuramoto et al. | 106/86 |
| 3,989,534 A | 11/1976 | Plunguian et al. | 106/646 |
| 4,021,259 A | 5/1977 | Komatsu et al. | 106/111 |
| 4,057,443 A | 11/1977 | Stiling et al. | 156/43 |
| 4,077,809 A | 3/1978 | Plunguian et al. | 521/83 |
| 4,084,980 A | 4/1978 | Motoki | 106/75 |
| 4,094,694 A | 6/1978 | Long | 106/111 |
| 4,119,597 A | 10/1978 | Enoue | 260/23 R |
| 4,153,470 A | 5/1979 | Stahl et al. | 106/116 |
| 4,174,230 A | 11/1979 | Hashimoto et al. | 106/109 |
| 4,240,839 A | 12/1980 | Crepeau et al. | 106/88 |
| 4,265,964 A | 5/1981 | Burkhart | 428/313.5 |
| 4,310,996 A | 1/1982 | Mulvey et al. | 52/809 |
| 4,323,526 A | 4/1982 | Hilbush, III | 264/36.16 |
| 4,330,589 A | 5/1982 | Saito et al. | 428/312.4 |
| 4,455,271 A | 6/1984 | Johnson | 264/42 |
| 4,518,652 A | 5/1985 | Willoughby | 428/312.4 |
| 4,548,734 A | 10/1985 | Chaux et al. | 516/53 |
| 4,644,014 A | 2/1987 | Thomson et al. | 521/68 |
| 4,731,389 A | 3/1988 | Christopher et al. | 521/103 |
| 4,751,024 A | 6/1988 | Shu et al. | 252/601 |
| 4,770,827 A | 9/1988 | Fischer | 264/51 |
| 4,804,688 A | 2/1989 | Vassileff | 521/64 |
| 4,810,569 A | 3/1989 | Lehnert et al. | 428/285 |
| 4,904,503 A | 2/1990 | Hilton et al. | 427/373 |
| 4,934,596 A | 6/1990 | Hilton et al. | 239/8 |
| 5,041,475 A | 8/1991 | Kambayashi et al. | 524/5 |
| 5,049,196 A | 9/1991 | Ries | 106/672 |
| 5,109,030 A | 4/1992 | Chao et al. | 521/83 |
| 5,110,362 A * | 5/1992 | Hoarty et al. | 106/708 |
| 5,155,959 A | 10/1992 | Richards et al. | 52/455 |

(Continued)

FOREIGN PATENT DOCUMENTS

CA 2144250 9/1995

(Continued)

OTHER PUBLICATIONS

International Search Report dated Apr. 15, 2002.

(Continued)

*Primary Examiner*—Irina S Zemel
(74) *Attorney, Agent, or Firm*—Nields & Lemack (57) ABSTRACT

Disclosed are formulations adapted to form a foamed cementitious composition, the foamed cementitious composition itself, a method of forming a hydraulic binder foam, and a method of conveying and applying the resulting foam to a substrate. A pumpable cementitious slurry is formed, the slurry is mixed with a gas such as air, and is subjected to mechanically created turbulence to generate gas bubbles and create a foam, which preferably is stabilized by a foam stabilizing agent such as polyvinyl alcohol present in the slurry. The foam is then conveyed to a nozzle or other suitable dispense point from which it is applied, for example sprayed, preferably uniformly, onto a substrate to be coated. Prior to dispensing, a set accelerator is preferably injected, which causes the foam to gel, which in turn improves the hangability of the product on a substrate. The spray material adheres to the substrate and hardens to form an insulative coating on the substrate. Also disclosed are dry compositions comprising a hydratable cementitious binder, a mechanical foam stabilizing agent, and optionally a fibrous component, set retarder and air entraining agent, said composition providing, on the addition of water, gas and mechanical turbulence, a settable foam which is capable of spray application to a steel structural member and which, after spray application, is adherent to the member in the foamed state and after setting. The foam after setting, forms a fire and heat protective adherent coating on the member.

2 Claims, 3 Drawing Sheets

U.S. PATENT DOCUMENTS

| | | | |
|---|---|---|---|
| 5,171,366 A | 12/1992 | Richards et al. | 106/772 |
| 5,227,100 A | 7/1993 | Koslowski et al. | 264/26 |
| 5,240,639 A | 8/1993 | Diez et al. | 516/14 |
| 5,246,143 A | 9/1993 | Cherfane | 222/145.2 |
| 5,360,771 A | 11/1994 | Delvaux et al. | 501/80 |
| 5,374,448 A * | 12/1994 | von Bonin | 427/2.31 |
| 5,395,571 A | 3/1995 | Symons | 264/42 |
| 5,466,393 A | 11/1995 | Diez et al. | 252/307 |
| 5,482,551 A | 1/1996 | Morris et al. | 106/772 |
| 5,519,084 A | 5/1996 | Pak-Harvey et al. | 524/503 |
| 5,554,658 A | 9/1996 | Rosenblatt | 521/51 |
| 5,641,584 A | 6/1997 | Andersen et al. | 428/703 |
| 5,643,510 A | 7/1997 | Sucech | 264/40.1 |
| 5,667,192 A | 9/1997 | Van Doren | 249/82 |
| 5,683,635 A | 11/1997 | Sucech et al. | 264/42 |
| 5,714,001 A | 2/1998 | Savoly et al. | 106/678 |
| 5,749,963 A | 5/1998 | Arnold et al. | 106/724 |
| 5,945,208 A | 8/1999 | Richards et al. | 428/294.7 |
| 6,010,565 A | 1/2000 | Bastain et al. | 106/122 |
| 6,010,596 A | 1/2000 | Song | 162/158 |
| 6,039,800 A | 3/2000 | Islam | 106/680 |
| 6,153,668 A | 11/2000 | Gestner et al. | 523/179 |
| 6,162,839 A | 12/2000 | Klauck et al. | 521/83 |
| 6,171,388 B1 | 1/2001 | Jobbins | 106/778 |
| 6,210,476 B1 | 4/2001 | Chatterji et al. | 106/677 |
| 6,227,294 B1 | 5/2001 | Chatterji et al. | 166/293 |
| 6,264,739 B1 | 7/2001 | Yamato et al. | 106/778 |
| 6,436,185 B1 * | 8/2002 | Ayambem et al. | 106/793 |
| 6,475,275 B1 | 11/2002 | Nebesnak et al. | 106/803 |
| 6,645,291 B2 * | 11/2003 | Ayambem et al. | 106/793 |
| 2002/0038618 A1 * | 4/2002 | Ayambem et al. | 106/792 |
| 2003/0105204 A1 * | 6/2003 | Ayambem et al. | 524/425 |
| 2004/0094863 A1 * | 5/2004 | Burge et al. | 264/219 |

FOREIGN PATENT DOCUMENTS

| | | |
|---|---|---|
| CA | 2207887 | 1/1998 |
| DE | 33 28 530 | 2/1985 |
| DE | 196 32 666 | 4/1998 |
| EP | 0 673 733 | 9/1995 |
| EP | 0 816 303 | 1/1998 |
| SU | 1 743 887 | 6/1992 |
| WO | 99/28266 | 6/1999 |
| WO | 01/14284 | 3/2001 |
| WO | 01/70647 | 9/2001 |

OTHER PUBLICATIONS

International Search Report dated Jul. 8, 2003.
Monokote Fireproofing Brochure.
Communication dated Mar. 1, 2004.

* cited by examiner

Injected Sample
1 millimeter

FIG. 1

These two images were taken at the same magnification

Uninjected Sample
1 millimeter

FOAMED FIREPROOFING COMPOSITION AND METHOD

This application is a divisional of Ser. No. 10/305,991 filed Nov. 27, 2002 now U. S. Pat. No. 6,699,915, which is a continuation-in-part of application Ser. No. 10/044,547 filed Jan. 11, 2002 now U. S. Pat. No. 6,780,230, which is a continuation-in-part of PCT/IB01/01604 filed Sep. 3, 2001, the disclosures of which are incorporated herein by reference.

BACKGROUND OF THE INVENTION

In the course of erecting steel structures, a thick coating of inorganic material is commonly applied to the metallic structural elements to achieve a number of objectives including fire retardation, improved appearance and sound deadening. While several types of formulations have been applied for these purposes over the years by means of a variety of techniques, the most successful system so far consists in spraying onto the steel surfaces settable aqueous mixes composed essentially of calcined gypsum, a lightweight inorganic aggregate material such as exfoliated vermiculite or shredded expanded polystyrene to lower the density of the mix, a mixture of fibrous materials such as a high wet bulking cellulose fiber and glass fiber, and an air entraining agent to render the wet mixture pumpable. A composition of this type is described by Bragg in U.S. Pat. Nos. 3,719,573 and 3,839,059, along with the most desirable application technique, i. e., pumping the aqueous mix and spraying it directly onto the steel in one layer. Such slurries are generally prepared at ground level and are pumped to the point of application, where they are spray-applied to the substrate. Often the point of application exceeds 20 or 30 stories where high rise construction is involved. Accordingly, pumpability of the slurries is an important criterion in their formulation and preparation. The slurries must be able to hold the large quantity of water that renders them capable of being pumped easily and to great heights, yet they must retain a consistency sufficient to prevent segregation or settling of ingredients and permit adequate yield or coverage of the substrate at a given thickness. The coating mixes must also adhere to the substrate, both in the slurried state during application, and in the dried or "set" state after application. In addition, the mix must set without undue expansion or shrinkage that could result in the formation of cracks that would seriously deter from the insulative value of the dry coating.

In the conventional process, fireproofing mixes are transported to the application site as dry mixtures and in a mixer an appropriate amount of water is added to form the pumpable slurry. The slurry is pumped from temporary holding equipment to the point of application. Where the components are pumped over distances, premature set-up can occur prior to reaching the final destination. In addition, the preparation and application processes may span many hours. Accordingly, the setting time of the mix is generally retarded by the inclusion of set retarding agents to provide an acceptable field pot life. In addition, air-entraining agents such as alpha-olefin sulfonate and sodium lauryl sulfate are used to aid pumpability of the slurry.

In addition, the relatively poor adherence and coherence to both unprimed and primed steel substrates of sprayable fireproofing compositions during and after setting or curing prevents workers from walking on the floor of the decking sprayed until the fireproofing has set or cured to adhere and cohere sufficiently to the substrate. More specifically, the decks cannot be sprayed on unfinished floors and/or roof decks until the concrete is poured (for floors) or the roofing (insulation, HVAC, etc.) is completed, since the activity taking place on the decks can cause the deck to flex and the fireproofing to fall off. The time necessary to achieve suitable adherence and coherence before walking on the deck has been generally longer than 24 hours.

Also, certain steel substrates are primed with material to which compositions containing hydraulic binders do not adhere or cohere well. In such instances, the substrate has to be either sandblasted, which is costly and often ineffective, or primed again with a tricoat to which the compositions would better adhere and cohere.

U.S. Pat. No. 4,904,503 to Hilton et al. teaches that acceleration of the setting time and also the "yield" of the aforedescribed pumped and sprayed fireproofing mixes is obtained by injecting an acidic set accelerating agent such as alum into the slurry prior to spraying. The acid agent, prior to causing accelerated set, reacts with basic material such as calcium carbonate present in the mix to generate gas such as carbon dioxide. The evolved gas expands or foams the slurry which further reduces the density and increases the volume of the applied fireproofing after setting per given weight of dry fireproofing used. Such "chemically foamed", "high yield" spray fireproofing has been successfully commercialized around the world.

The "yield" or volume of applied fireproofing per weight of dry mix is an important factor in the commercial success of the product. The higher the yield, the more coverage an applicator can obtain for a given amount of formulation. Yield is generally calculated by methods known in the art as board feet per dry weight of composition.

U.S. Pat. No. 3,963,507 discloses a foaming mortar containing specific ratios of water-soluble, low-viscosity cellulose derivatives such as methyl cellulose, ethyl methyl cellulose and hydroxyethyl methyl cellulose; high-viscosity cellulose derivatives, and polyvinyl alcohol as a foaming accelerator.

U.S. Pat. No. 4,518,652 discloses a method for producing gypsum wallboard by producing a foam comprising polyvinyl alcohol and water, introducing the foam into an aqueous cementitious slurry, depositing the slurry between paper cover sheets, and allowing the slurry to set. An emulsion of asphalt and wax can be added to the cementitious slurry to impart water resistance.

U.S. Pat. No. 4,518,652 forms lightweight gypsum wallboard by incorporating pre-generated foams into gypsum slurries followed by setting of the foam-slurry mix. The foam is formed by dissolving polyvinyl alcohol in water and placing it into a high shear foaming apparatus.

It would be desirable to produce a pumpable, low density, high yielding sprayable fireproofing composition that eliminates or reduces the need for a lightweight aggregate.

It further would be desirable to produce a low density, high yielding, pumpable, sprayable fireproofing composition that can be easily prepared at the site of the application without the need for high shear foaming devices and the like, and which upon application, results in excellent yields.

It also would be desirable to produce a pumpable, sprayable fireproofing composition that has excellent adherence and coherence to the substrate upon which it is being applied, even before the composition completely sets or cures.

SUMMARY OF THE INVENTION

The present invention relates to formulations adapted to form foamed and unfoamed cementitious compositions, the foamed cementitious composition itself, a method of forming a hydraulic binder foam, methods of conveying and applying the resulting cementitious compositions to a substrate, and methods of obtaining enhanced adherence and coherence of cementitious compositions to a substrate. More specifically, in one embodiment of the present invention, a pumpable cementitious slurry is formed, optionally the slurry is mixed with a gas such as air, and is then optionally subjected to mechanically created turbulence to generate gas bubbles and create a foam, which preferably is stabilized by a foam stabilizing agent such as polyvinyl alcohol present in the slurry. A substrate adherence and coherence enhancing agent such as a liquid latex may be added. The foam or unfoamed composition is then conveyed to a nozzle or other suitable dispense point from which it is applied, for example sprayed, preferably uniformly, onto a substrate to be coated. Prior to dispensing, a set accelerator is preferably injected, which causes the foam to gel, which in turn improves the hangability of the product on a substrate. The spray material adheres to the substrate and hardens to form an insulative coating on the substrate. The particularly preferred compositions are capable of providing a high yield of fireproofing that can be applied to substrates at typical commercial application rates of about 1800 boardfeet/hour.

The present invention is also directed to a dry composition comprising a hydratable cementitious binder, a mechanical foam stabilizing agent and/or a substrate adherence and coherence enhancing agent, and optionally a fibrous component, set retarder and air entraining agent, said composition providing, on the addition of water, and the optional addition of gas and mechanical turbulence, a settable foam or slurry which is capable of spray application to a steel structural member and which, after spray application, is adherent to the member in the foamed or slurried state and after setting. The foam or slurry after setting, forms a fire and heat protective adherent coating on the member.

The substrate adherence and coherence enhancing agent improves the adherence of the compositions to the substrate during and after setting or curing. Such adherence is created by the bond created between the crystals formed during setting or curing and the substrate. The substrate adherence and coherence enhancing agent also improves the coherence of the compositions to the substrate during and after setting or curing. The presence of the agent may be particularly advantageous where the compositions are applied when ambient temperatures are near or below 0° C. Under such conditions, any ice formation on the substrate negatively impacted the ability of the composition to stay on the substrate. This required that either the application be delayed until ambient temperatures increased, or artificially increasing the ambient temperature to avoid ice formation. With the substrate adherence and coherence agent of the present invention, the compositions can be effectively applied without having to heat the substrate above 0° C.

DETAILED DESCRIPTION OF THE INVENTION

Suitable hydraulic binders useful for the formation of a cementitious slurry in the present invention include Portland cement, aluminous cement, pozzolanic cement, gunite, calcium sulfate hemi-hydrate (gypsum, both non-hydrated and hydrated Plaster of Paris), and mixtures thereof, with gypsum being particularly preferred. Portland cement is known to be the binder of choice where resistance to moisture is important or in high traffic areas where higher density (e.g., 15-30 pcf, more typically 22-26 pcf) coatings are desired. While gypsum can be used in higher density applications, it is usually used for light density (about 5-19 pcf, preferably about 10-15 pcf) compositions. Preferably the binder is used in an amount of about 10 to about 98% by weight, more preferably about 90 to about 95% by weight. Preferably the hydraulic binder is provided in a finely divided dry powder form.

The term "foam" is used herein to mean a group of bubbles separated from one another by thin films, the aggregation having a finite static life sufficiently long to allow for conveying and spraying of the foam in accordance with the present invention.

In order to stabilize the foam mechanically formed in accordance with the present invention, surfactants, protein compounds, and/or hydrophilic compounds or polymers that are soluble, miscible or dispersible in water are suitable. The preferred foam stabilizing agent is polyvinyl alcohol, most preferably powdered polyvinyl alcohol. The amount of polyvinyl alcohol used as a foam stabilizing agent is preferably in an amount of from about 1% to 12% inclusive by mass of water, more preferably about 2% to 10% inclusive, even more preferably about 2% to 8%, most preferably about 2-3% in order to ultimately produce a foam of the desired density. The viscosity of the polyvinyl alcohol used affects the volume increase of the foamed composition from the unfoamed state. Preferred polyvinyl alcohols are partially hydrolyzed grades with a degree of hydrolysis mol % in the range of 79% to 90%, preferably about 88%, with an ester value mg KOH/g of 140, and residual acetyl content weight percent of 10.7. Examples of suitable polyvinyl alcohols are the Mowiol grade sold by Clarient, 4/88 through to 40/88, which at 20° C. and at a 5% concentration in water, each have viscosities of 8 Pa.s for 4/88, 9 mPa.s for 5/88, 12 mPa.s for 8/88, 55 mPa.s for 18/88 (which is particularly preferred), 75 mPa.s for 23/88 and 100 mPa.s for 40/88; and Celanese Celvol 523S and 523 SF. It is most preferable that the polyvinyl alcohol be used in the form of a powder. The powder must be comprised of particles sufficiently small to ensure that the polyvinyl alcohol readily dissolves in water. Powdered polyvinyl alcohols having particles averaging from 80 to 400 microns have been found to be suitable. Those skilled in the art can readily determine which commercially available polyvinyl alcohol powders in addition to the foregoing are suitable.

Other suitable foam stabilizers include fluoro surfactants such as those commercially available from duPont, including Zonyl FS300, which is a general-purpose non-ionic fluoro surfactant free of organic solvents, unaffected by hard water or pH, with a large capacity to wet out. These may be used in an amount of from about 0.005% to about 0.5% inclusive by mass of water. Suitable protein compounds include hydrolyzed protein based concentrates. Protein compounds may be used in an amount of from about 2% to about 5% inclusive by mass of water. Suitable hydrophilic compounds or polymers include modified starches, natural carbohydrates such as gums or seaweed colloids, semi-synthetic polymers such as the cellulose ethers, hydrogels such as the homo- and co-polymer derivatives of acrylic and methacrylic acid, or the polyacrylamide polyacrylate co-polymers, and dispersions such as polyvinyl acetate and styrenated acrylics.

In contrast to the chemically foamed, pumped and sprayed fireproofing described in the aforementioned U.S. Pat. No. 4,904,503 and presently used in commercial practice, the foams of the present invention are mechanically created. Foam generation apparatus such as high shear mixers known in the board-making art can be used. However, it has been found that such devices are unnecessary and that the mechanical creation of turbulence effective to generate gas bubbles and thereby foam the slurry can be carried out in the tubing or hosing conventionally used in present pump and spray fireproofing applications, which tubing or hosing is also used to convey the resulting foam to a dispense point such as a nozzle for ultimate spray application to the substrate. The gas, preferably compressed air, preferably is introduced into the hose or tube in which the slurry is resident, such as by injection. In one embodiment of the present invention, the location of the gas introduction into the hose or tubing is near the dispense point, since it has been found that as the hose or tube length increases after the point of gas introduction, the longer it takes for the foam to reach steady state (defined as capable of being dispensed from the hose at a uniform rate without large pulses of gas). It is desirable that steady state be reached, otherwise the foam is ejected from the dispense point as plugs rather than a uniform spray. Pulsed dispense makes it difficult to uniformly apply the foam to the substrate, as the pulses of gas tend to "blow" the product off of the substrate as fast as it can be sprayed onto the substrate. In addition, locating the gas introduction relatively close to the point of application minimizes the length of hose through which the foam needs to be conveyed.

The density of the foam produced is a function of the rate of flow of the slurry as well as the length and diameter of the hose or tubing, as well as the gas pressure and gas volume (cfm) injected into the foam, and the residence time of the slurry (and foam) in the hose or tube. Those skilled in the art can adjust the foregoing parameters to achieve the desired final density of the product. For example, one suitable system uses a 50 foot hose having a diameter of ¾ inch and air injection at a rate of 26 cfm at 70 psi. If the hose or residence time of the composition in the hose is too short, insufficient foaming will occur. If the hose or residence time of the composition in the hose is too long, steady-state will not be realized and the composition will form plugs which "spit" from the exit and cannot be readily spray-applied to the substrate in a uniform manner as mentioned above. The objective is to provide a hose of sufficient length and diameter so that the composition entering the hose in a slurried state can be foamed with gas and reach steady-state prior to the composition exiting the hose. Those skilled in the art balance the flow rate as well as the length and diameter of the hose with the gas pressure and gas volume being injected into the hose to achieve a desired foam consistency and density. It has been found that for a given hose diameter and a given air pressure, shorter hoses result in the foamed product reaching equilibrium or steady-state faster than longer length tubes. For example, the foam reached equilibrium in a 25 foot hose having a 0.5 inch diameter in 30 seconds compared to more than 300 seconds for a 0.5 inch diameter hose 150 feet long. Similarly, foams in hoses 25 and 50 feet long with diameters of ¾ inch reached equilibrium immediately, whereas lengths of 100 feet at a diameter of ¾ inches took 55 seconds and 150 feet with the same diameter took more than 300 seconds.

Suitable hose or tubing lengths include 15 to 150 feet, with diameters including ½", ⅝", ¾" and 1 inch. Shorter length hoses allow the product to reach equilibrium or steady state faster than longer lengths. For a given formulation, the density of the product was the same regardless of whether the tube was coiled or laid in straight line. An advantage of the present invention is that the fireproofing can be applied using lighter weight hoses than those conventionally used, easing the burden on the applicator.

The compositions of the present invention can include a fibrous component. The fibrous component can be either organic or inorganic. Preferably, the fibrous component is a mixture of a high wet bulking organic fiber, preferably cellulose fiber as described in U.S. Pat. Nos. 3,719,513 and 3,839,059, and an inorganic fiber which provides reinforcement, preferably steel or glass fiber. Polymeric reinforcing fibers such as polypropylene fibers also can be used. Other suitable components include silica, diatomaceous earth, expanded perlite, exfoliated vermiculite, shredded expanded polystyrene, alumina, grog, colloidal silica, ceramic fibers, mineral fibers and combinations thereof. The total amount of the fibrous component in the composition is preferably in the range of about 0% to about 40% by weight. A particularly preferred composition comprises about 4% to 10% by weight of high wet bulking cellulosic fiber and about 0.0% to about 1% by weight of glass fiber, with about 1% cellulosic fiber and about 0.5% glass fiber being especially preferred. Other optional additives include methyl cellulose or other suitable thickeners or air stabilizers known to those skilled in the art, in an amount from about 0.1 to about 5%, chemical air entrainers in an amount of from about 0.1 to about 3%; polyvinyl acetate in an amount of from 0 to about 5%; clay in an amount of from about 1% to about 5%; gas generants such as calcium carbonate in an amount of about 0% to about 5%; and a biocide to inhibit bacterial formation. Where possible, the optional components are added in the dry state to the hydraulic binder in order to form a slurry precursor or admixture for convenience.

A substrate adherence and coherence enhancing agent can be added to the compositions of the present invention. Advantageously, the preferred substrate adherence and coherence enhancing agent is polyvinyl alcohol, which also serves as the foam stabilizing agent in the embodiment of the present invention where the addition of air and mechanical turbulence is used to foam the compositions. Suitable types and amounts of polyvinyl alcohol for use as the substrate adherence and coherence enhancing agent are as disclosed above in the context of the foam stabilizing agent. Other substrate adherence and coherence enhancing agents include polyethylene glycols; poly(vinylacetate); poly(ethylene-vinyl acetate) copolymers; poly(ethylacrylates); poly(methacrylic) acid; starches; natural thickeners (e.g., guar gum), and mixtures of the foregoing.

Since the compositions of the present invention are typically transported to the application site as dry mixtures and are formed into slurries upon the addition of the appropriate amount of water, the preparation and application process may span many hours or even days, and thus the setting time of the mix is generally heavily retarded to provide an acceptable field "pot life". This retarding contradicts the desired quick setting time upon application to the ultimate substrate, and thus a delicate balance of retarding and accelerating is difficult to achieve. Were the mixture to set prematurely, it would be rendered non-pumpable and useless for the intended application. Accordingly, a retarder is preferably used to delay the set time of the composition to avoid premature set. Suitable retarders are conventional in the art, and include maleic anhydride, used in an amount of 0.1% to 0.75% inclusive by mass of the hydraulic binder, sodium polyacrylate and polyacrylic blend. The preferred retarder is the standard proteineous retarder used in the industry, such as that commercially available under the name Goldbond High Strength Retarder. The retarder is preferably added to the hydraulic binder in the dry state for convenience.

Accelerators can be added to the cementitious composition in order to decrease the set time upon a structure. Any set accelerating agent capable of satisfactorily offsetting the retardation of the slurry within the desired time period without deleteriously effecting the same or the substrate which is the subject of the application can be used. For most commercial applications, the type and amount of accelerator is that which rapidly converts the setting time from about 4 to about 20 hours to about 5 to 15 minutes. The amount required to provide such a setting time will vary depending upon the accelerator and the type and amount of retarder and binder. Generally, an amount in the range of about 0.1% to 20% by weight of dry accelerator based upon the weight of dry fireproofing is used, with 1-5% being preferred. Suitable accelerators are those known to accelerate the set of the hydraulic binder employed. For gypsum based hydraulic binders, suitable accelerators include aluminum sulfate, aluminum nitrate, ferric nitrate, ferric sulfate, ferric chloride, ferrous sulfate, potassium sulfate, sulfuric acid, sodium carbonate, sodium bicarbonate and acetic acid. Aluminum sulfate is a preferred accelerator. It can be used as a solution. Where Portland cement is the hydraulic binder, conventional set accelerators can be used such as calcium chloride, calcium formate, calcium nitrate, calcium nitrite, alkali aluminates, and silicates such as water glass.

It has further been found that the introduction of aluminum sulfate into the foamed composition can be used to control the stability of the foam by modifying the microstructure of the formulation, particularly in compositions comprising polyvinyl alcohol as the foam stabilizing agent and calcium sulfate hemihydrate as the hydraulic binder. Specifically, foams that are "more stable" produce finer structures, while foams that are "less stable" produce coarser structures. The size of the voids or pores formed thus can be critical, and can be controlled by controlling the rate of reaction of the calcium sulfate hemihydrate with water to form calcium sulfate dihydrate. Aluminum sulfate can be used to accelerate this reaction, thereby controlling the stability of the resulting foam such as by producing foam having a finer microstructure. In essence, introduction of the aluminum sulfate into the foam reacts with the binder and causes it to set, thereby "freezing" the microstructure of the foam. Preferably the introduction of aluminum sulfate is introduced near or at the nozzle used to spray the foam onto the substrate, such as by using a nozzle as disclosed in U.S. Pat. No. 4,904,503, the disclosure of which is hereby incorporated by reference.

Figure 1:
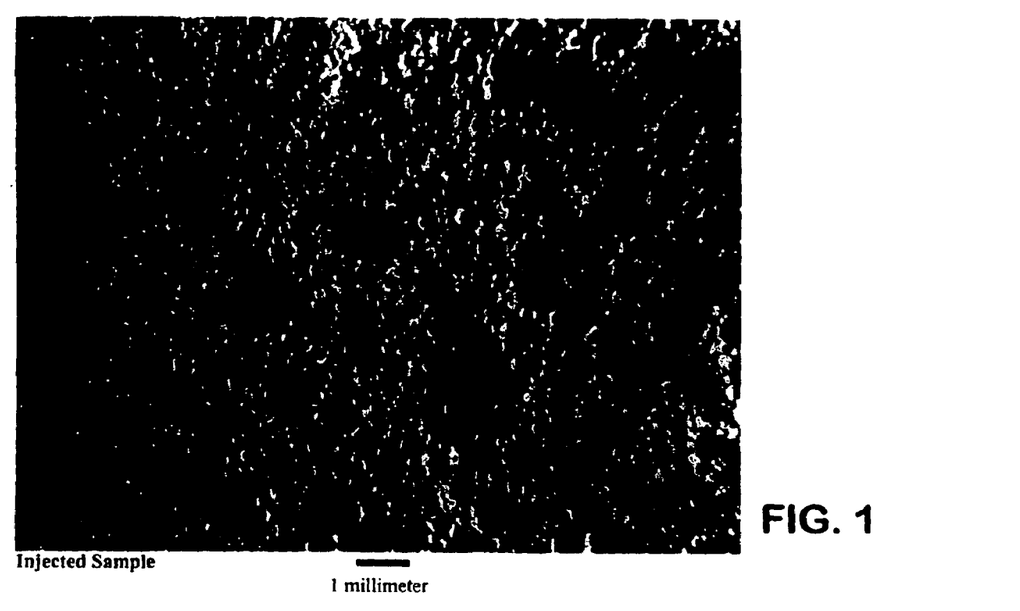
FIG. 1 is an electron microscope image of the microstructure of a foam in accordance with one embodiment of the present invention where aluminum sulfate is injected into the foam.
Figure 2:
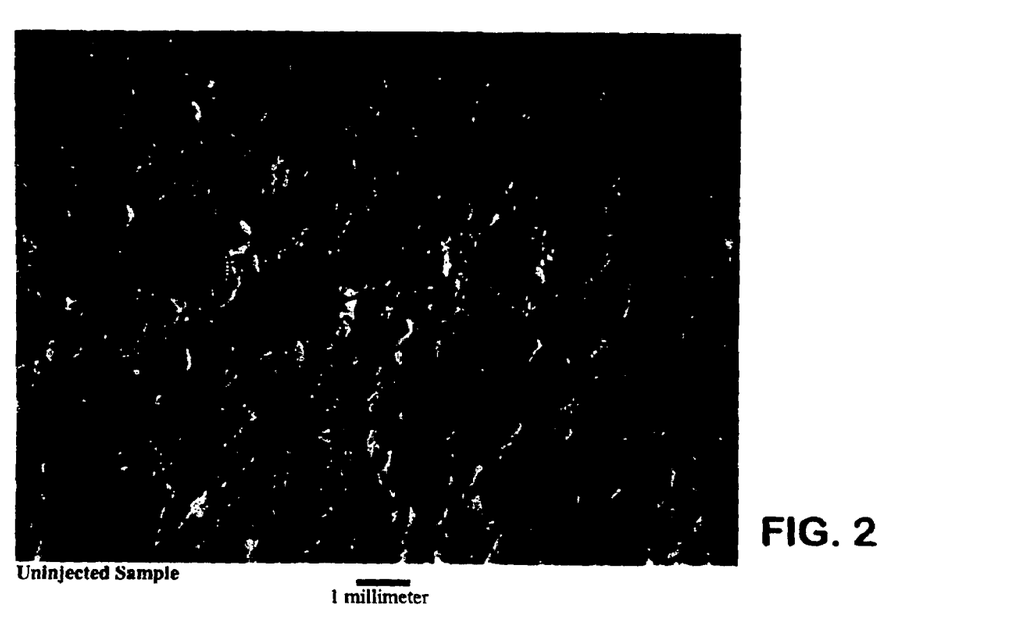
FIG. 2 is an electron microscope image of the microstructure of a foam in accordance with one embodiment of the present invention where aluminum sulfate is not injected into the foam.

The dramatic results achieved in the microstructure of the foam upon the addition of aluminum sulfate can be seen with reference to FIGS. 1-2. FIGS. 1 and 2 are foams prepared under identical conditions except that the foam in FIG. 1 was injected with alum at the spray nozzle, whereas the foam of FIG. 2 received no alum injection. The resulting foam of FIG. 1 shows a finer microstructure than that of FIG. 2.

The introduction of set accelerator, such as alum, in a mixture that includes a foam stabilizer, such as polyvinyl alcohol and an air-entraining agent such as alpha olefin sulfonate, also causes the foam to "gel". The consistency of the foam changes from a "shaving cream" consistency to a "sticky" mass upon the introduction of set accelerator and its distribution into the foam. Gel formation enhances the ability of the product to (adhere and cohere) remain or "hang" on a substrate, particularly a steel beam or the like, before and during the setting time. The addition of a basic substance such as calcium carbonate enhances the gelling. The set accelerator thus serves to both form the gel, and then to accelerate the setting of the hydraulic binder.

Figure 3:
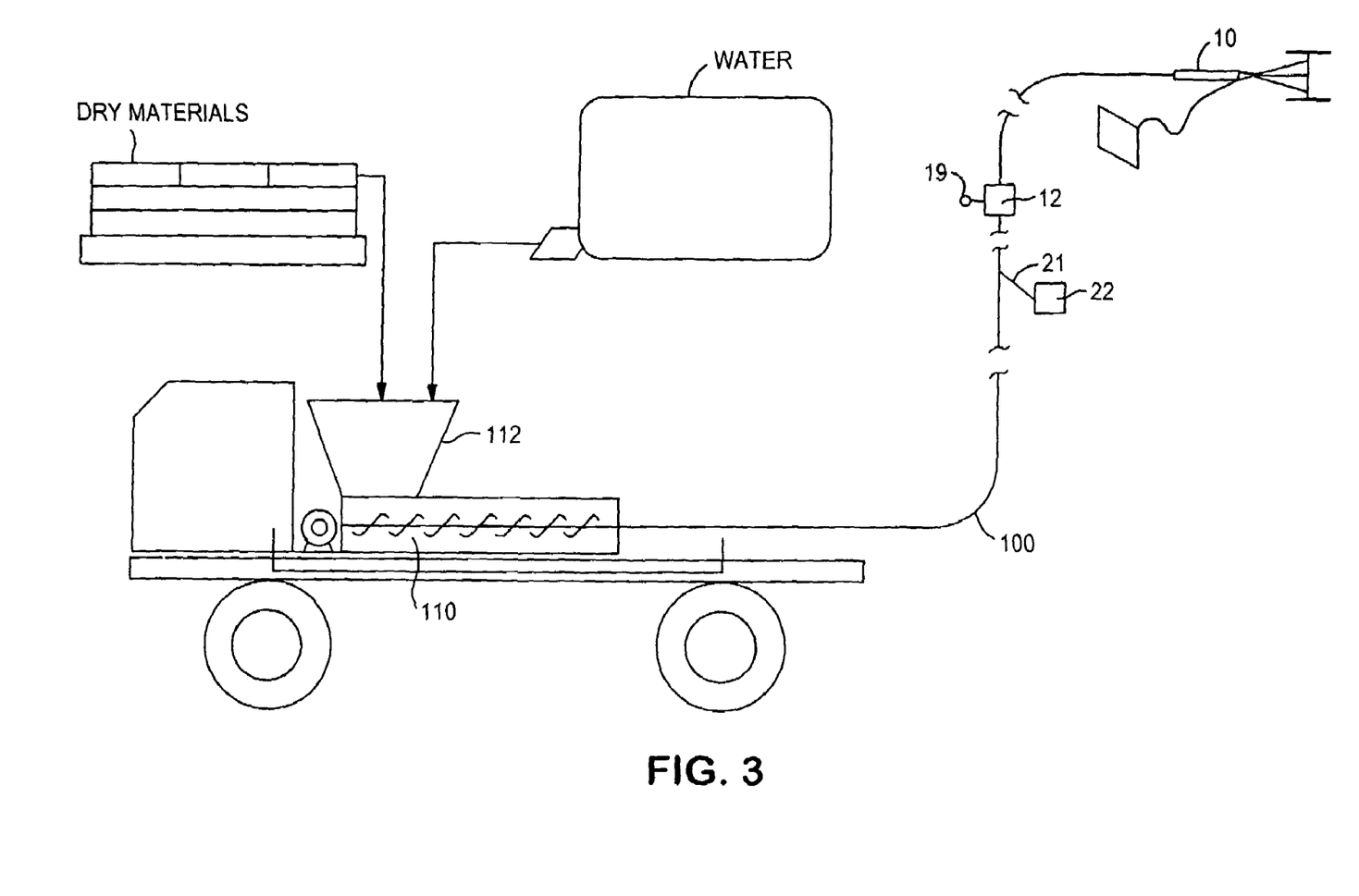
FIG. 3 is a schematic representation of apparatus suitable for mixing, foaming and conveying the components to a dispense point in accordance with an embodiment of the present invention.

With reference to FIG. 3, to form the cementitious slurry in accordance with the present invention, the hydraulic binder, set retarder, foam stabilizing agent and/or substrate adherence and coherence enhancing agent, and water are mixed in a hopper 112, together with optional components such as the fibrous material. A lightweight aggregate is not needed in view of the inherent lightweight provided by the foaming. Where foaming is not used, the lightweight aggregate can be added. Suitable lightweight aggregates are well known to those skilled in the art and include expanded or unexpanded vermiculite, perlite, glass beads and shredded polystyrene. The order of addition of the various components is not critical. Preferably the mixing is carried out at or near the site of application, both to avoid premature setup of the composition and to limit the distance the slurry has to be conveyed once formed. Dry material, such as the hydraulic binder, retarder, and other optional components, are mixed in a hopper 112 or other suitable mixing vessel. Water and foam stabilizing agent and/or substrate adherence and coherence enhancing agent are added, together or separately, to form the cementitious slurry. In a preferred embodiment of the present invention, where powdered polyvinyl alcohol is the foam stabilizing agent and/or substrate adherence and coherence enhancing agent, the powdered polyvinyl alcohol is mixed with the hydraulic binder, retarder and optional components in the dry state. Water is then added to the dry mixture to form a pumpable cementitious slurry. The slurry thus formed is conveyed, preferably by pumping with pump auger 110, to a hose or tubing 100 as discussed above. Conveyance of the slurry should be at commercially feasible rates, generally about 1800 board feet/hour. Variable speed rotor stator pumps such as the Putzmeister S-5 are suitable for this purpose.

The most preferred dry mix formulation in accordance with the present invention that, upon addition of water, forms a slurry, comprises 90-95% stucco, 1-3% powdered PVA (Mowiol 18-88 G-2 powder), 1% cellulosic fibers, 0.5% glass fibers, 0-2% calcium carbonate, 0.25% alpha-olefin sulfonate, 0.1-0.3% retarder, and 0-2% Portland cement. This formulation, particularly with the inclusion of calcium carbonate, upon the addition of water the mechanical formation of foam, and the set acceleration by alum addition at or near the spray nozzle, results in a low density product (dry density 9.3 pcf) exhibiting improved hangability (1-1.5 inches thick on a steel substrate) at a low cost. A small amount of basic substance such as Portland cement can be added to minimize or prevent any significant carbon dioxide generation caused by the alum reacting with carbonate. The Portland cement raises the pH of the mix and inhibits the reaction of the acidic accelerator with base. The above preferences may vary depending upon the desired final density of the product.

Gas, preferably air, is introduced, preferably by injection, into the hose with a pipe or tube 21 in communication with a compressor 22. Sufficient gas is introduced to foam the slurry and to convey the resulting foam towards the nozzle 10. Those skilled in the art will appreciate that this introduction of air to mechanically foam the slurry and convey the resulting foam is different from the conventional use of chemical air-entraining agents to entrain air in an open system to improve pumpability. Although the introduction of gas at a single location is preferred, gas can be introduced at several locations along the hose, if desired.

In order to further reduce or eliminate pulsing that can occur as the foam is sprayed from the hose, the pressure in the hose can be controlled a number of different ways. Controlling the pressure in the hose provides a dampening effect to the spraying operation. Pressure also can be used to control the rate of spray out of the nozzle 10. In addition, the final density of the product can be controlled using pressure. In its simplest form, a pressure relief valve or the like can be incorporated in the hose in order to vent gas (air) from the hose to control the pressure in the hose. In another more preferred embodiment, an air-separating and foam flow control enclosure 12 defining an expansive volume (relative to the hose) can be placed in line, whereby the foam in the hose is fed into the inlet of the enclosure and is forced out an outlet in the enclosure to a further length of hose leading to the nozzle. The enclosure can have a controlled vent in order to regulate the pressure therein. The mass flow rate into the enclosure is controlled by the pump pumping the slurry into the hose, and the mass flow rate out of the enclosure is controlled by the pressure in the enclosure. The velocity of the gas used to convey the foam in the hose is high, which makes it difficult to effectively spray the foam. The enclosure 12 allows the gas that is conveying the foam to separate from the foam, and allows control of the flow rate of the foam independent of that velocity.

Figure 4:
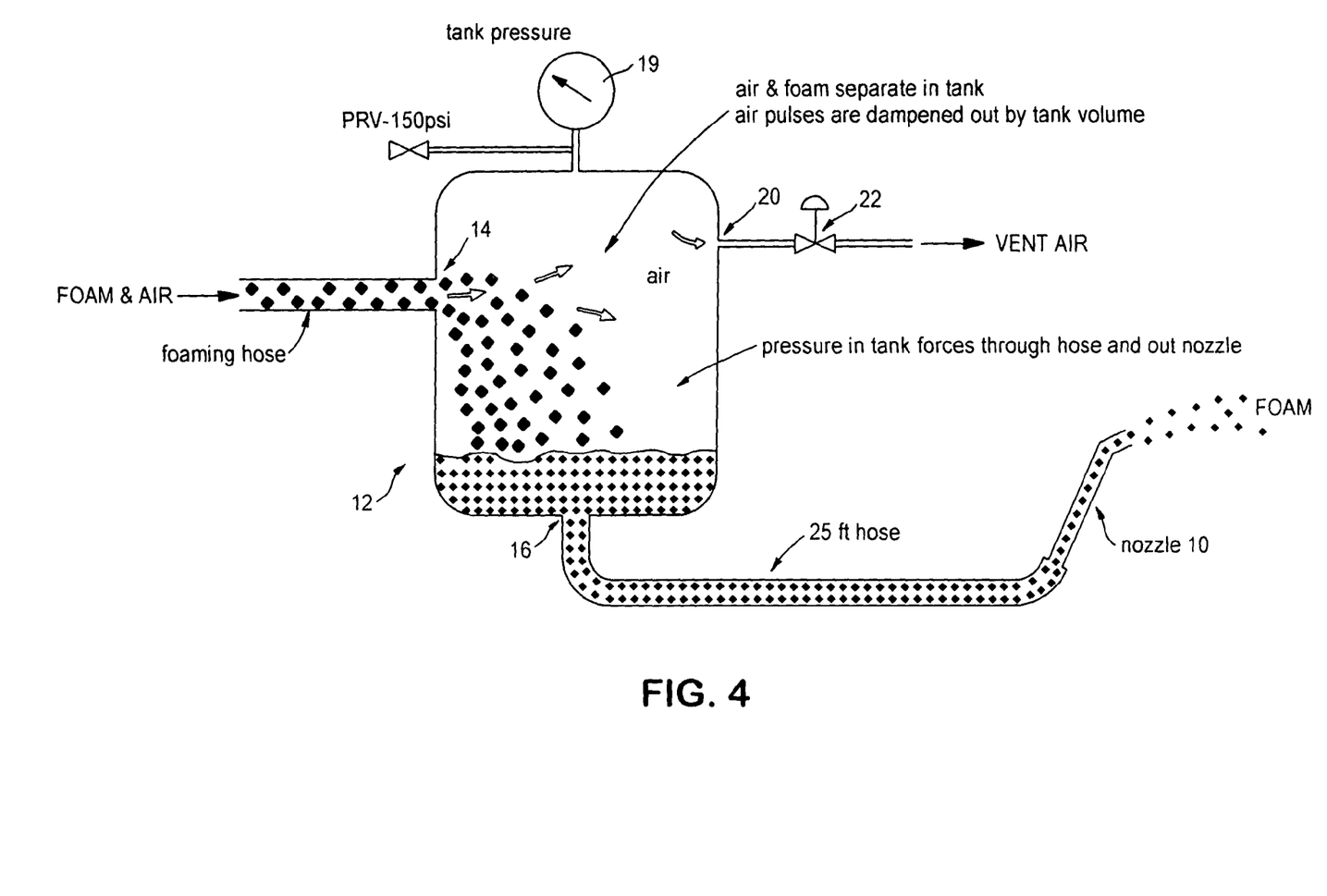
FIG. 4 is a schematic representation of an air-separating and foam flow control enclosure in accordance with an embodiment of the present invention.

Turning now to FIG. 4, there is shown such an enclosure 12 having an inlet 14 communicating with the hose conveying the foam and an outlet 16 spaced from the inlet 12. The foam being conveyed by compressed air in the hose enters the enclosure 12 at the inlet 14. As the foam/air mixture enters the enclosure 12, the excess (i.e., conveying) air separates from the foam and the foam falls to the bottom of the enclosure 12 where it is forced out the outlet 16 by the pressure in the enclosure 12 into a further length of hose 18 and finally out nozzle 10. An air vent 20 in communication with a valve 22 such as a gate valve allows the pressure in the enclosure 12 to be controlled to a desirable level. The pressure can be controlled manually or automatically. A pressure gauge 19 displays the enclosure 12 pressure. Suitable pressures in the enclosure 12 can be controlled to between about 10 and about 65 psi, depending upon the flow rate desired and the exiting hose diameter and length. A pressure of about 40 psi. has been found to be particularly suitable in one application. This has been found to be sufficient pressure to cause the foam to be forced out of the outlet 16 and travel through the hose 18 and be sprayed out of nozzle 10 at an acceptable rate. An added advantage is that because the foam is under pressure, additional air entrainment occurs since more air is forced into the foam. The result is an even lower density product compared to identical formulations sprayed absent the enclosure 12.

Preferably the length of hose from the outlet 16 of the enclosure 12 to the nozzle 10 is from about 15 to 30 feet. The diameter of the hose 18 should be as small as possible in order to provide hose flexibility for ease of application. However, as the diameter decreases, more pressure is needed to convey the foam through the hose, and as the pressure increases, the spray tends to exit the nozzle faster, which may be undesirable. Diameters of from 1 to 1.5 inches have been found to be suitable, with a hose length of about 25 feet being especially preferred in order to ensure that the enclosure 12 does not interfere with the applicator. For example, where the applicator is operating in a high-rise building, preferably the enclosure 12 is located on the same floor as the applicator, whereas the mixing and pumping equipment for mixing and pumping the slurry is generally located on the ground floor of the building.

In the present system, the amount of air that is contained in the product is substantially greater than conventional pump and spray fireproofing compositions. In general, the amount of air contained in the product of the present invention is at least about twice the amount contained in conventional pump and spray fireproofing products, and is preferably at least about 4 times that amount.

EXAMPLES 1-6

In all cases, all of the materials listed in Table 1 except for water were dry blended for 3 minutes to have a uniform mixture. This mixture was then added to a standard paddle mixer and the water was added. This combination was mixed for 2 minutes. The slurry produced was poured into the pump hopper of a rotor/stator type pump (Putzmeister S-5). The slurry was then pumped to another location, where air was injected into the slurry that was in the hose. This air injection turned the slurry into a foam in the 30' of ¾" foaming hose.

In Formulas 1 and 2 in Table 1, the foam entered an air-separating and foam flow control enclosure that was pressurized to 37 psi. The foam then was forced out of the enclosure and passed through 25' of 1" hose and a standard spray nozzle. Alum was injected into the foam as the foam was passing through the spray nozzle.

In Formulas 3, 4, 5 and 6, the air-separating and foam flow control enclosure was not used. A standard spray nozzle was attached directly to the end of the 30' of ¾" hose in which the foaming was taking place (see the end of the paragraph above). As in cases 1 and 2, alum was injected into the foam as the foam was passing through the spray nozzle.

Table 1 shows the final density of the products. Formula 6 is a high density product containing Portland cement as the primary hydraulic binder.

TABLE 1

| Materials | Formula 1 (pounds) | Formula 2 (pounds) | Formula 3 (pounds) | Formula 4 (pounds) | Formula 5 (pounds) | Formula 6 (pounds) |
| --- | --- | --- | --- | --- | --- | --- |
| Polyvinyl alcohol | 2 | 3 | 3 | 4 | 2 | 3.3 |
| Stucco | 94.15 | 92.95 | 93.85 | 91.85 | 93.85 | 15.9 |
| Proteinaceous retarder | 0.1 | 0.3 | 0.3 | 0.3 | 0.3 | 1.4 |
| Cellulosic fiber | 1 | 1 | 1 | 1 | 1 | 1.1 |
| Glass fiber | 0.5 | 0.5 | 0.5 | 0.5 | 0.5 | 0.5 |
| Portland cement | 2 | X | X | X | X | 77.8 |
| Air entrainment (alpha olefin sulfonate) | 0.25 | 0.25 | 0.35 | 0.35 | 0.35 | X |
| calcium carbonate | X | 2 | 1 | 2 | 2 | X |
| Water | 100 | 100 | 100 | 100 | 100 | 90 |
| Foaming air psi | 98 | 100 | 100 | 100 | 97 | 38 |

TABLE 1-continued

| Materials | Formula 1 (pounds) | Formula 2 (pounds) | Formula 3 (pounds) | Formula 4 (pounds) | Formula 5 (pounds) | Formula 6 (pounds) |
| --- | --- | --- | --- | --- | --- | --- |
| Foaming air cfm | 37 | 37 | 48 | 42 | 60 | 27 |
| slurry rate (pounds/hour) | 960 | 1216 | 1024 | 1024 | 1024 | 125 |
| alum addition | 3 | 2 | 3 | 1 | 3 | 5 |
| final density (pcf) | 12.4 | 9.9 | 9.2 | 7.9 | 11.4 | 22.9 |

EXAMPLE 7

In an example of a pumped and sprayed foam of the invention, suitable for use in "shotcrete" applications (sealing the walls of tunnels and mines), the stucco and retarder used in Formula 6 of Table 1 is replaced by additional Portland cement. The cellulose and glass fiber used in Formula 6 is replaced by conventional steel fiber used in shotcrete applications, and the resulting formula is processed as in the foregoing Examples 1-6, except that sodium aluminate is used as the set accelerator in place of alum.

EXAMPLE 8

This example demonstrates the substrate adherence and coherence enhancement characteristics of polyvinyl alcohol. PVA was added to a gypsum-based commercial fireproofing product (Sample 1). The formulation used is presented in the following

TABLE

| Component | Sample 1 % (wt.) | Sample 1 with PVA % (wt.) |
| --- | --- | --- |
| Expanded polystyrene | 3.93 | 3.85 |
| stucco | 83.78 | 82.10 |
| cellulosic fiber | 4.96 | 4.86 |
| clay | 3.53 | 3.46 |
| fungicide | 0.02 | 0.02 |
| proteinaceous retarder | Adj | Adj |
| alpha olefin sulfonate | 0.20 | 0.20 |
| PVA | 0.00 | 2.00 |
| calcium carbonate | 3.53 | 3.46 |

The objective is to determine if adding PVA to compositions increased bond to untreated and primed steel plates. Bond was measured using test method ASTM E 736. Two tests were run using the above formulation; one for adhesion, the other for cohesion. The sample was oven-dried for 3 days. The results are tabulated below.

TABLE

Summary of Data

| | Test 1 Bare Steel | | Test 2 | |
| --- | --- | --- | --- | --- |
| | (psf) | Failure | Primed (psf) | Failure |
| Sample 1 (No PVA) | 1006.9 | Adhesive | 793.2 | Cohesive |
| Sample 1 (with PVA) | 1296.7 | Adhesive | 1144.6 | Cohesive |

Adhesive failure occurs when the composition separates from the substrate. Cohesive failure occurs when the composition breaks internally. The data show that there is a significant increase in adhesive and cohesive strength of the formulation of Sample 1 with 2% PVA.

What is claimed is:

1. A dry mixture for forming a fireproofing composition adapted to be spray applied to a steel substrate, said dry mixture comprising a hydraulic binder, a steel substrate adherence and coherence agent in an amount effective for enhancing the adherence and coherence to said steel substrate, and a set retarder, said dry mixture providing, upon the addition of water, a pumpable slurry capable of spray application to a steel substrate and which, after spray application is adherent to said substrate, wherein said hydraulic binder is present in an amount of 90 to 95%, and said substrate adherence and coherence agent is powdered polyvinyl alcohol in an amount of 1-3%.

2. The dry mixture of claim 1, wherein said dry mixture further comprises 0.25% alpha-olefin sulfate, 0.5% glass fibers, 1% cellulosic fibers, 0-2% calcium carbonate, 0.1-0.3% retarder, and 0-2% Portland cement.

* * * * *